Patented July 22, 1947

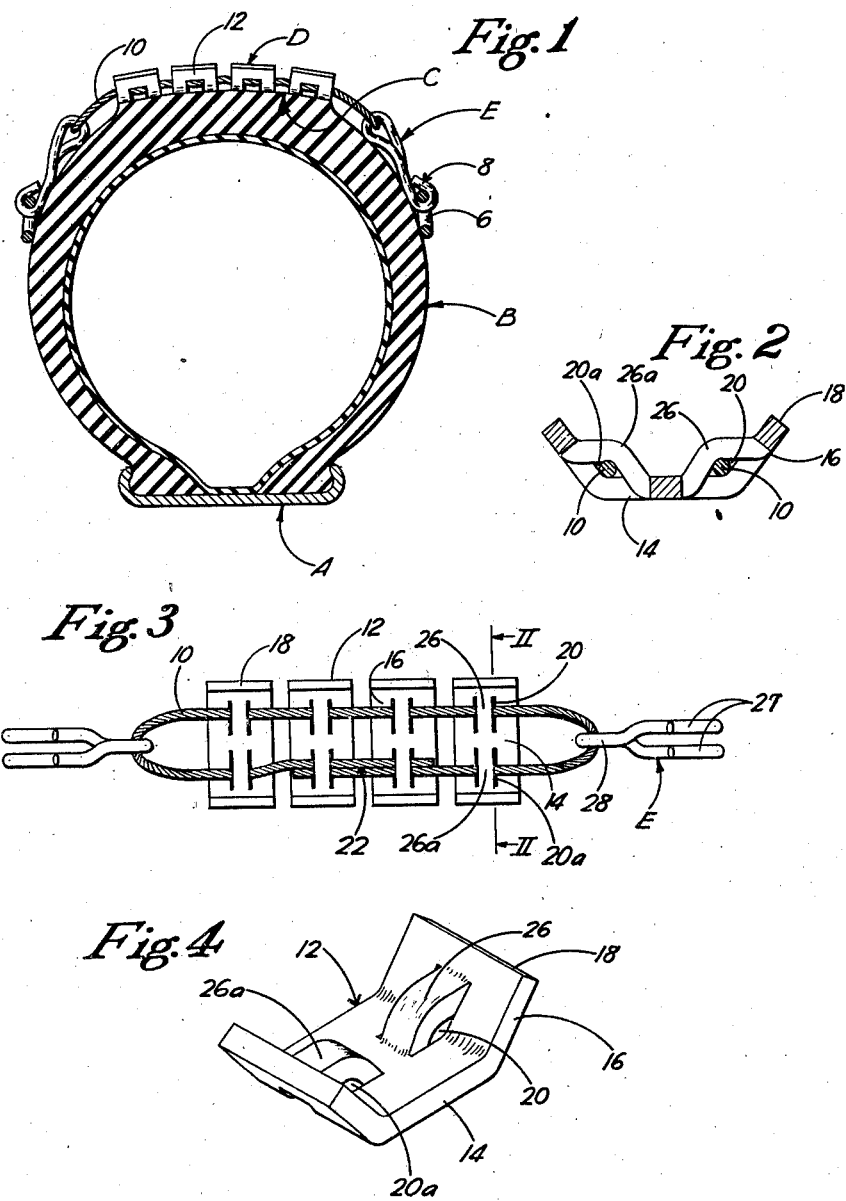

2,424,478

UNITED STATES PATENT OFFICE 2,424,478

TIRE CROSS CHAIN

Robert C. Mason, Pittsburgh, Pa.

Application January 10, 1946, Serial No. 640,171

9 Claims. (Cl. 152—225)

In accordance with the present invention, there are provided certain improvements in anti-skid tire chains, and more particularly in an improved cross or tread chain forming a part thereof.

It is a universal practice to provide the tires of the driving wheels of motor vehicles with anti-skid chains when roadway surfaces become covered with ice or snow. These anti-skid chains customarily are made up of a pair of side chains that engage the side walls of a tire circumferentially thereof, these side chains being connected by a plurality of cross or tread chains which are spaced around the tire and closely engage the treads of the tire. These cross-chains generally are composed of series of chain links which wear away and break in a short time.

It is among the objects of this invention to provide a cross-chain which has a much longer life than those made from chain links, which provides better traction on ice and snow, which is stronger and more durable, and which does not become clogged with ice and snow.

A further object of the invention is to provide an improved mounting means for the tread elements that facilitates greatly the assembly of the tread elements.

Further objects of the invention will become apparent as the description proceeds, and the features of novelty will be pointed out in particularity in the appended claims.

The invention will be understood more readily by reference to the accompanying drawings, in which Fig. 1 is a transverse section of a rim of a wheel of a motor vehicle on which rim a tire is mounted, there being shown an anti-skid chain on the tire which embodies cross-chains of the improved construction of the present invention;

Fig. 2 is an enlarged transverse section taken through an improved anti-skid cross-chain of the present invention, the view being taken on the line II—II of Fig. 3;

Fig. 3 is a plan view of an improved cross-chain of the present invention, the view being taken looking at the traction surfaces of the tread elements and showing the improved mounting means for the tread elements; and Fig. 4 is a detailed perspective view of one of the improved tread elements of the present invention, showing enlarged details of the construction thereof.

Referring more particularly to the drawings, reference character A designates the rim of a wheel of a motor vehicle, which rim may be of any suitable type. Upon this rim is mounted a tire casing B, this casing having the usual tread portion C. The tire casing B is shown as being provided with an anti-skid chain having side links 6, to which the opposite ends of spaced cross-chains 8 are attached.

The cross-chains of the present invention are composed of an intermediate portion or link D and attaching instrumentalities E for attaching the cross-chains to the side links 6. Each of the links D is composed of a flexible cable 10 which is formed preferably of twisted strands of galvanized steel wires of gauge and quality suitable for affording adequate flexibility for readily conforming the cross-links by manual adjustment to the transverse configuration of the tire. The flexible cable 10 forms the mounting means for mounting and assembling the tread elements 12, as will be described hereinafter in greater detail. The tread elements 12 preferably are made from small metal plates composed of hard, wear-resisting steel, preferably case hardened, containing from 0.10 to 0.20 per cent carbon. The tread elements have a flat back portion 14, adapted to lie flat against the tread portion C of the tire, and traction portions 16 having traction surfaces 18 adapted to engage the surface of the roadway along which the vehicle is traveling. The traction portions 16 are divergent from the back portion 14, so that the opposite traction surfaces 18 are substantially farther apart than the corresponding dimensions of the flat back portion 14. This divergence of the traction portions 16 is effective for preventing loosened snow or ice from a roadway becoming packed between the traction portions, thus keeping the tread elements clean for efficient gripping and penetration of a slippery coating on a roadway. The angle that these diverging traction portions 16 make with the back portion 14 also is rather critical, for it must be wide enough to prevent this packing of loosened snow and ice between the traction portions, and yet not be too wide for inhibiting efficient contact of the traction surfaces 18 with the roadway. In practice, this angle between the traction portions 16 and the back portion 14 is made approximately 135 degrees. Traction surfaces 18 are provided with sharp edges and corners for efficient penetration of an icy roadway surface.

It will be seen that when the cross-chain of the present invention is completed, the cable 10 is bent into an endless, substantially elliptical configuration, such as an elongated loop, the parallel sides of which are spanned by the tread elements 12. In order to mount the tread elements on the cable 10, each of these elements is provided with recesses, indicated at 20 and 20a substantially at the juncture of the traction portions 16 with the back portion 14. These recesses are formed by providing the tread elements with suitably spaced parallel slits which extend through the traction portions 16 and into the back portion 14, and by pressing out the intermediate metal into ribs sufficiently far to form spaces large enough for the passage of the cable 10 therethrough. The cable is passed through each succeeding space 20 of the several tread elements 12 and the cable is sufficiently long so that its ends project a substantial distance beyond the tread elements to enable the ends to be bent around and inserted in openings 20a in the same manner. These ends are brought into overlapping relation to form a short double length 22 of the cable which passes through a couple of successive spaces 20a, the cable thereby being bent into the aforesaid substantially elliptical configuration with end loop portions 24 adapted to receive the attaching instrumentalities E.

When the traction elements 12 thus have been assembled on the cable, the aforesaid ribs of pressed-out metal, indicated at 26, 26a, are pressed back against the cable to pinch the cable in the angles between the back portions of the tread elements 12 and the traction portions thereof. Therefore, the ribs tightly clamp the cable and tread elements to each other rigidly enough to restrain the traction elements against displacement along the cable, and to prevent the overlapping ends of the cable from pulling away from each other. This manner of fastening the tread elements to the cable loop eliminates welding or separate fastening members. It will be observed that the cable is spaced from the tread portion of the tire by the tread elements, so those elements can rest flat against the tire and cannot pull away from the cable. The flexibility of the cable enables the tread elements 12 to be brought readily into conformity with the configuration of the tire tread and into tight and uniform engagement therewith.

Connected to the end loops of cable 10 are the attaching members E which are hooks preferably made by bending a suitable length of stiff wire or rod into a double hook 27 and a loop 28 in which the cable is received. The cable is inserted in each hook by manually pressing the cable between the doubly bent wire until it enters the loop 28. The stiffness and strength of the wire forming the hooks prevent accidental displacement of the hooks from the cable, therefore enabling ready attachment of the cross-chain to the side links 6.

It will be seen that the provision of anchoring openings or recesses 20, 20a in no way lessens the strength of the tread elements 12; and the ribs 26, 26a actually reinforce and brace the traction portions 16 against deformation in service. It will be noted further that while the traction surfaces 18 have sharp corners and edges, those surfaces are the same thickness as the remainder of the tread elements 12, which is only sufficient for rigidity, so that increasing wear does not impair the ice-penetrating character of the traction portions 16. The length of the traction portions allows a great deal of wear before they are worn away. By forming ribs 26, 26a at the inside of the angles between traction portions 16 and back portion 14, there is enough metal to produce the outwardly bowed ribs without stretching the rib metal materially.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A cross-chain for anti-skid tire chains, comprising a flexible wire cable adapted to extend across a vehicle tire, means for holding the cable in place, and a plurality of tread elements extending across the cable, each of said elements having a body provided with a struck-out portion holding said cable tightly against the body.

2. A cross-chain for anti-skid tire chains, comprising a flexible wire cable formed into an elongated loop, means connected to the opposite ends of the loop for fastening it in place across a vehicle tire, and a plurality of tread elements extending across the loop and secured to both sides of it.

3. A cross-chain for anti-skid chains for motor vehicle tires, comprising an endless flexible mounting cable having a pair of substantially parallel sides and curved end portions, a plurality of tread elements spaced along the mounting cable and spanning its parallel sides, and means for frictionally clamping the tread elements to both of said parallel sides.

4. A cross-chain for anti-skid tire chains, comprising a mounting member adapted to extend across a vehicle tire, and a plurality of tread elements extending across said member, each of said elements being provided with a struck-out rib between which and the body of the element the mounting member extends, and said rib pressing said member tightly against the body of the tread element.

5. A cross-chain for anti-skid tire chains, comprising a flexible wire cable forming an elongated loop and having overlapping end portions at one side of the loop, a plurality of tread elements extending transversely across said loop, and means for clamping said elements to both sides of the loop and to said overlapping end portions of the cable.

6. A cross-chain for anti-skid chains for motor vehicle tires, comprising a flexible mounting cable bent into an endless configuration having a pair of spaced approximately parallel sides, a plurality of tread elements spaced along the mounting cable and spanning its parallel sides, and clamping ribs integral with the tread elements for frictionally clamping the tread elements to both of said parallel sides, the said clamping ribs reinforcing the tread elements against distortion during service.

7. A cross-chain for anti-skid tire chains, comprising a flexible wire cable formed into an elongated loop, a plurality of laterally spaced tread elements extending across the loop between it and the tire, each of said tread elements having a back portion from the ends of which traction portions project outwardly for engagement with a roadway, and ribs integral with the tread elements and extending across the sides of the loop to clamp them in the angles between said back portions and traction portions.

8. An anti-skid tread element for use with a flexible wire cable loop stretched across a vehicle tire, said tread element being formed in one-piece from a metal plate and having a substantially flat back portion from only the opposite ends of which traction portions diverge, and said tread element having struck-out portions adapted to clamp the sides of said loop in the angles between said back portion and said traction portions.

9. An anti-skid tread element for use with a flexible wire cable loop stretched across a vehicle tire, said tread element being formed in one-piece with roadway-engaging ends connected by a tire-engaging body, said element also having struck-out ribs adapted to extend across the sides of said loop and to hold the cable against said body.

ROBERT C. MASON.

REFERENCES CITED

The following references are of record in the file of this patent:

UNITED STATES PATENTS

| Number | Name | Date |
|---|---|---|
| 2,099,006 | Eger | Nov. 16, 1937 |
| 1,644,077 | Nesbitt | Oct. 4, 1927 |
| 1,405,051 | Love | Jan. 31, 1922 |

FOREIGN PATENTS

| Number | Country | Date |
|---|---|---|
| 582,751 | France | 1925 |